(12) United States Patent
Chitty et al.

(10) Patent No.: US 7,813,935 B2
(45) Date of Patent: Oct. 12, 2010

(54) SYSTEM FOR EVALUATING OVER AND UNDERBALANCED DRILLING OPERATIONS

(75) Inventors: Greg Chitty, Houston, TX (US); Brant Bennion, Calgary (CA)

(73) Assignee: Weatherford/Lamb, Inc., Houston, TX (US)

( * ) Notice: Subject to any disclaimer, the term of this patent is extended or adjusted under 35 U.S.C. 154(b) by 646 days.

(21) Appl. No.: 11/035,025

(22) Filed: Jan. 13, 2005

(65) Prior Publication Data

US 2005/0192855 A1 Sep. 1, 2005

Related U.S. Application Data

(60) Provisional application No. 60/536,024, filed on Jan. 13, 2004.

(51) Int. Cl.
*G06Q 99/00* (2006.01)
(52) U.S. Cl. .............................. 705/1; 705/7; 705/400; 702/9; 702/12; 703/10; 166/290; 175/61
(58) Field of Classification Search .............. 166/250.1, 166/290; 175/48, 50, 65, 61; 702/9, 12; 705/1.1, 10, 400, 7; 703/10
See application file for complete search history.

(56) References Cited

U.S. PATENT DOCUMENTS

| | | | | |
|---|---|---|---|---|
| 3,660,649 | A | * | 5/1972 | Gilchrist et al. ............ 705/400 |
| 3,761,701 | A | * | 9/1973 | Wilder et al. ................ 702/9 |
| 3,949,820 | A | | 4/1976 | Furse |
| 4,845,628 | A | * | 7/1989 | Gray et al. .................... 702/9 |
| 4,917,188 | A | | 4/1990 | Fitzpatrick, Jr. |
| 5,086,850 | A | * | 2/1992 | Harris et al. ................. 175/61 |
| 5,253,708 | A | | 10/1993 | Alexander |

(Continued)

FOREIGN PATENT DOCUMENTS

WO WO 98/46857 10/1998

(Continued)

OTHER PUBLICATIONS

"New Experience, Tools Drive Underbalanced Drilling", Jan./Feb. 2003, Drilling Contractor, pp. 38-39.*

(Continued)

*Primary Examiner*—John W Hayes
*Assistant Examiner*—Freda A Nelson
(74) *Attorney, Agent, or Firm*—Patterson & Sheridan, L.L.P.

(57) ABSTRACT

A method and a computer program for economic evaluation of completion methods for drilling a well. An extensive user interface is provided for inputting of reservoir data and parameters relating to a first completion method. A rigorous first skin factor is generated based on the reservoir data and first drilling parameters. An interface is preferably provided for entering cost data related to the first completion technique and a first total cost can be generated. Production data is optionally generated from the first skin factor. The production and cost data can then be combined to generate an economic analysis of the first completion technique. The process can be repeated for alternate completion techniques. Preferably, ranges can be entered for certain reservoir and/or cost variables. Multiple iterations can be performed on the ranges resulting in total cost and production ranges which can be combined to yield ranges of economic data for statistical analysis. This results in a user being able to choose the most advantageous completion method.

27 Claims, 12 Drawing Sheets

U.S. PATENT DOCUMENTS

| | | | |
|---|---|---|---|
| 5,458,192 | A | 10/1995 | Hunt |
| 5,642,787 | A | 7/1997 | Hutchinson |
| 5,853,054 | A | 12/1998 | McGarian et al. |
| 5,862,870 | A | 1/1999 | Hutchinson |
| 5,877,126 | A | 3/1999 | Masikewich et al. |
| 6,061,634 | A * | 5/2000 | Belani et al. ................. 702/12 |
| 6,065,550 | A | 5/2000 | Gardes |
| 6,165,947 | A | 12/2000 | Chang et al. |
| 6,234,258 | B1 | 5/2001 | Karigan |
| 6,663,117 | B2 | 12/2003 | Cheney et al. |
| 7,085,696 | B2 * | 8/2006 | King ........................... 703/10 |
| 7,512,543 | B2 * | 3/2009 | Raghuraman et al. .......... 705/7 |
| 2002/0188431 | A1 | 12/2002 | Ding et al. |
| 2003/0029644 | A1 | 2/2003 | Hoffmaster et al. |
| 2003/0085036 | A1 | 5/2003 | Curtis et al. |
| 2003/0225522 | A1 | 12/2003 | Poe |
| 2004/0007131 | A1 | 1/2004 | Chitty et al. |
| 2004/0031622 | A1 | 2/2004 | Butler et al. |

FOREIGN PATENT DOCUMENTS

| | | |
|---|---|---|
| WO | WO 01/62603 | 8/2001 |

OTHER PUBLICATIONS

"General Underbalanced presentation to the DTI", 2002, Weatherford Underbalanced Services, 71 pages.*

Sumrow, Mike, "Underbalanced Drilling Driven by Success", Feb. 11, 2002, Oil & Gas Journal; p. 54-55, 2 pgs.*

Culen et al. "Omani Field Tests Compare UBD Favorably to Conventional Drilling", May 2003, World Oil, v 224, n 5, 27, 8 pgs.*

Haseltan et al. "Wells drilled Overbalanced and Underbalanced Prove UBD Value", May 2002, World Oil, v 223, n 5, p. 35(4).*

"Wells yield direct OBD, UBD comparisons", Mar./Apr. 2002, Driiling Contractor, pp. 22-24.*

U.K. Examination Report, Application No. GB0500672.1, dated Dec. 12, 2006.

Ridha B. C. Gharbi, Economic Optimization of EOR Processes Using Knowledge-Based System: Case Studies, Petroleum Science and Technology, vol. 19, Issue 7&8 Jul. 2001, Abstract, www.informaworld.com/smpp/content ~content=a713646759~db=all.

Material Balance Modeling of Hydrocarbon Reservoir Systems, www.eproductionssolutions.com/Solutions/EPS/MatBal.htm, eProduction solutions Jul. 2007.

GB Search Report, Application No. GB0500672.1, dated Jun. 21, 2007, claims 11-13.

GB Search Report, Application No. GB0500672.1, dated Jun. 21, 2007, claims 14-19.

Canadian Office Action, 2,492,422, dated Sep. 8, 2006.

GB Search Report, Application No. GB0718484.9, dated Oct. 17, 2007.

GB Search Report, Application No. GB0718483.1, dated Oct. 18, 2007.

U.K. Search Report, Application No. GB0500672.1, dated May 13, 2005.

Journal of The Institution of Civil Engineers, C. F. Colebrook, Turbulent Flow in Pipes, with Particular Reference to the Transition Region Between the Smooth and Rough Pipe Laws, vol. 11 (1938-39).

V. G. Jenson and G.V. Jeffreys, Mathematical Methods in Chemical Engineering, Academic Press, pp. 379-447 (1977).

SPE 26521, Z. Su and J.S. Gunmundsson, Friction Factor of Perforation Roughness in Pipes (Oct. 3-6, 1993).

SPE/PS-CIM 65516, Y. Tang, et al, Performance of Horizontal Wells Completed with Slotted Liners and Perforations (Nov. 6-8, 2000).

SPE Monograph, J.P. Brill and H. Mukherjee, Multiphase Flow in Wells, vol. 17, pp. 6-9, 41, 92-94 (1999).

Journal of Petroleum Technology, B. J. Dikken, Pressure Drop in Horizontal Wells and Its Effect on Production Performance, vol. 42, No. 11 (Nov. 1990).

SPE 6133, E.M. Blount, L.G. Jones, and O.H. Glaze, Use of Short Term Multiple Rate Flow Tests to Predict Performance of Wells Having Turbulence (Oct. 3-6, 1976).

SPE 4529, M. J. Fetkovich, The Isochronal Testing of Oil Wells (Sep. 30-Oct. 3, 1973).

SPE Production and Facilities, H. J. Yuan, C. Sarica and J. P. Brill, Effect of Perforation Density on Single-Phase Liquid Flow Behavior in Horizontal Wells, vol. 14, No. 3, pp. 203-209 (Aug. 1999).

SPE 48937, H. Yuan, C. Sarica and J. Brill, Effect of Completion Geometry and Phasing on Single-Phase Liquid Flow Behavior in Horizontal Wells, pp. 25-36 (Sep. 27-30, 1998).

SPE 37492, A. Retnanto, M. J. Economides, et al., Optimization of the Performance of Partially Completed Horizontal Wells, pp. 785-792 (Mar. 9-11, 1997).

SPE 18247, M. Karakas and S. Tariq, Semianalytical Productivity Models for Perforated Completions, pp. 643-658 (Oct. 2-5, 1988).

SPE 24984, J.K. Pucknell and J.N.E. Mason, Predicting the Pressure Drop in a Cased-Hole Gravel Pack Completion, pp. 227-235 (Nov. 16-18, 1992).

SPE Reservoir Engineering, D.K. Babu and A.S. Odeh, Productivity of a Horizontal Well, vol. 4, No. 4, pp. 417-421 (Nov. 1989).

Elsevier Scientific Publishing Company, L.P. Dake, Fundamental of Reservoir Engineering, pp. 145 & 151(1978).

SPE 5589, H. Cinco-Ley, et al, Pseudo-Skin Factors for Partially-Penetrating Directionally-Drilled Wells (1975).

Journal of Petroleum Technology, F. Brons and V.E. Marting, The Effect of Restricted Fluid Entry on Well Productivity, pp. 172-174 (Feb. 1961).

SPE-AIME Journal of Petroleum Technology, C.E. Cooke, Jr., Conductivity of Fracture Proppants in Multiple Layers, pp. 1101, 1107 (Sep. 1973).

SPE Journal, M. Prats, Effects of Vertical Fractures on Reservoir Behaviour-Incompressible Fluid Case, pp. 105-118 (Jun. 1961).

AIME 251, Journal of Petroleum Technology, L.G. Jones and J.W. Watts, Estimating Skin Effect in a Partially Completed Damaged Well, pp. 249-252 (Feb. 1971).

SPE Formation Evaluation, M. J. Economides, C.W. Brand and T.P. Frick, Well Configurations in Anisotropic Reservoirs, pp. 257-262 (Dec. 1996).

McGowen, Harold E, III, et al.—"Applicability of Underbalanced Drilling to Multilateral Junctions", IADC Underbalanced Drilling Conference, Houston, Texas, Aug. 2000, pp. 1-14.

Rehm, William, et al.—"Underbalanced Drilling", Petroleum Technology Transfer Council, based on a workshop sponsored by the Oklahoma Geological Survey and PTTC's South Midcontinent Region on Jul. 11, 2001 in Norman, Oklahoma, 3 pages.

Boyle, John E.—"Underbalanced Drilling Services: Think Value, Not Cost," Weatherford W Magazine, Oct. 2000 (a publication of Weatherford International, Inc., vol. 2, No. 2), pp. 2-5.

Weatherford —"Underbalanced Systems—Less Pressure. More Flow," Weatherford Drilling & Intervention Services Brochure #290.00, 2001, 11 pages.

Bennion, D. Brant, et al.—"Formation Damage and Horizontal Wells—A Productivity Killer?", SPE 37138, prepared for presentation at the International Conference on Horizontal Well Technology held in Calgary, Alberta, Canada, Nov. 18-20, 1996, 12 pages.

Bennion, D. B., et al—"Underbalanced Drilling: Praises and Perils", SPE Drilling & Completion, Dec. 1998, pp. 214-222.

Bennion, D. B., et al.—"Underbalanced Drilling and Completion Operations to Minimize Formation Damage—Reservoir Screening Criteria for Optimum Application", The Journal of Canadian Petroleum Technology, Sep. 1998, vol. 37, No. 9, pp. 36-50.

Bennion, D. Brant, et al.—"Underbalanced Drilling: A Reservoir Design Perspective", presented at the 7th Annual Petroleum Society/SPE Conference on Horizontal Well Technology held in Calgary, Alberta, Canada, Nov. 3, 1999, 22 pages.

Chitty, Greg H., et al.—"Corrosion Issues with Underbalanced Drilling in H$_2$S Reservoirs", SPE 46039, prepared for presentation at the 1998 SPE/ICoTA Coiled Tubing Roundtable held in Houston, Texas, Apr. 15-16, 1998.

Chitty, Greg H., et al.—"Is a Zero AFE Possible with Underbalanced Drilling?", OTC 15060, prepared for presentation at the 2003 Offshore Technology Conference held in Houston, Texas, May 5-8, 2003, p. 1-7.

Gilmore, Todd—"Formation Damage in Production and Injection Wells Discussed at Meeting", Techbits, Sep. 2001, p. 16.

McNealy, Richard, et al.—"Corrosion Inhibition of Low-Alloy Steels in Brine with Highly Oxygenated Nitrogen Membrane Gas for Underbalanced Drilling Applications", SPE 124044, prepared for presentation at the 2009 SPE Annual Technical Conference and Exhibition held in New Orleans, Louisiana, Oct. 4-7, 2009, pp. 1-11.

Van Der Werken, T., et al.—"Reservoir Screening Methodology for Horizontal Underbalanced Drilling Candidacy", IPTC 10966, prepared for presentation at the International Petroleum Technology Conference held in Doha, Qatar, Nov. 21-23, 2005, pp. 1-11.

Weatherford International Ltd.—"SURE Enhances UB Candidate Selection Process", Weatherford W Magazine, vol. 6, No. 1, 2004 First Quarter, pp. 6 and 7.

\* cited by examiner

| WELL NAME | WFT RECORD |
|---|---|
| CNRL ET AL HZ MIDWINTER D - 041-G/094-P- | 11 |
| CNRL ET AL HZ MIDWINTER D - 049-E/094-P- | 12 |
| CNRL ET AL HZ MIDWINTER D - 054-E/094-P- | 13 |
| CNRL ET AL HZ N HELMET A - 011-E/094-P-1 | |
| CNRL ET AL HZ N HELMET A - 015-G/094-P-1 | |
| CNRL ET AL HZ N HELMET A - 017-E/094-P-1 | 20 |
| CNRL ET AL HZ N HELMET A - 020-E/094-P-0 | 4 |
| CNRL ET AL HZ N HELMET A - 034-B/094-P-1 | |
| CNRL ET AL HZ N HELMET A - 034-E/094-P-1 | |
| CNRL ET AL HZ N HELMET A - 040-B/094-P-1 | |
| CNRL ET AL HZ N HELMET A - 074-G/094-P-1 | |
| CNRL ET AL HZ N HELMET A - 078-B/094-P-1 | |
| CNRL ET AL HZ N HELMET A - 096-I/094-P-0 | |
| CNRL ET AL HZ N HELMET A - 098-H/094-P-1 | |
| CNRL ET AL HZ N HELMET B - 054-J/094-P-0 | |
| CNRL ET AL HZ N HELMET B - 071-E/094-P-1 | |
| CNRL ET AL HZ N HELMET B - 071-G/094-P-1 | |
| CNRL ET AL HZ PEGGO A - 051-I/094-P-02 | |
| CNRL ET AL HZ PEGGO A - 052-I/094-P-02 | |
| CNRL ET AL HZ PEGGO A - 051-L/094-P-01 | |
| CNRL ET AL HZ PEGGO A - 057-L/094-P-01 | |

| COUNTRY | PROVINCE-STATE | COUNTY-PARISH | WELLNAME |
|---|---|---|---|
| CANADA | BRITISH COLUMBIA | | CZAR ET AL HZ MIDWINTER |

JEAN MARIE UB OB IHS WELLS

| LATITUDE | LONGITUDE | TV DEPTH | KB ELEV | SUBSEA | R/R DATA | LIC DATA | ON PROD |
|---|---|---|---|---|---|---|---|
| 59.86435 | -120.6269 | 2062 | 538.4 | -1523.6 | 2/15/1996 | 12/11/1995 | 03/01/ |

JEAN MARIE UB HORIZONTAL IHS PRESSURE DATA

| TESTID | DATE | TYPE | PROD(HOURS) | SHUT IN TIME(HRS) | WELLHD PRESS (KPA) | RUN DEPTH (M CF) | RUN |
|---|---|---|---|---|---|---|---|
| IP1 | | 0 | 0 | 698 | 0 | 0 | |
| P1 | 2/21/1996 | 4 | | 144 | 0 | 1000 | |
| P2 | 3/5/1996 | 5 | | 153.6 | 0 | 1232 | |

JEAN MARIE UB HORIZONTAL IHS PRODUCTION

| YEAR | MONTH | PROD(HOURS) | OIL | GASMONTHLY (E3m3) | WATERMONTHLY (E3m3) |
|---|---|---|---|---|---|
| 1996 | 3 | 113 | 0 | 118.3 | 0 |
| 1996 | 4 | 626 | 0 | 494.3 | 26.9 |
| 1996 | 5 | 684 | 0 | 414.3 | 2 |
| 1996 | 6 | 550 | 0 | 408.3 | 0 |
| 1996 | 7 | 739 | 0 | 423.3 | 0 |
| 1996 | 8 | 734 | 0 | 384.8 | 19.8 |
| 1996 | 9 | 696 | 0 | 354.6 | 9.9 |
| 1996 | 10 | 739 | 0 | 373.6 | 5.2 |
| 1996 | 11 | 703 | 0 | 329.5 | 0.2 |
| 1996 | 12 | 722 | 0 | 343.9 | 0 |
| 1997 | 1 | 708 | 0 | 337.1 | 3 |
| 1997 | 2 | 636 | 0 | 286.7 | 1.5 |
| 1997 | 3 | 696 | 0 | 331.9 | 3.7 |
| 1997 | 4 | 684 | 0 | 285.5 | 9 |

FIG. 4

| Project Formation | Well Data | Drilling Parameters | Drilling Fluid | Reservoir | Formation Damage | Flow Module | Risked Reservoir Variables | AFE |

Formation Data

Formation Name
Formation Top Depth (m)
Formation Base Depth (m)
Net to Gross pay (Fraction)
Net Pay (m)
Current Reservoir Pressure (kPa)
Current Reservoir Temperature (C)
Formation O-W Contact Angle (Deg)

FORMATION TYPE
○ Sandstone
● Limestone
○ Dolomite
○ Granit
○ Evaporate

FRACTURE DATA
Smallest Aperture of Fracture (microns)
Largest Aperture of Fracture (microns)
Most Frequent Occuring Size (microns)
Fracture Density (fractures/meter of pay)
Fracture Orientation if Known

FORMATION IS
☒ Naturally Fractured
☒ Vulgular

VUGS DATA
Type of Vugs
Frequency of Vugs

| Basic Core Data | XRD Data |

| Sample No. | Interval (m) | Kh (mD) | Kv (mD) | Phi(fraction) |
|---|---|---|---|---|
| * | | | | |

Formation Average

FIG. 5

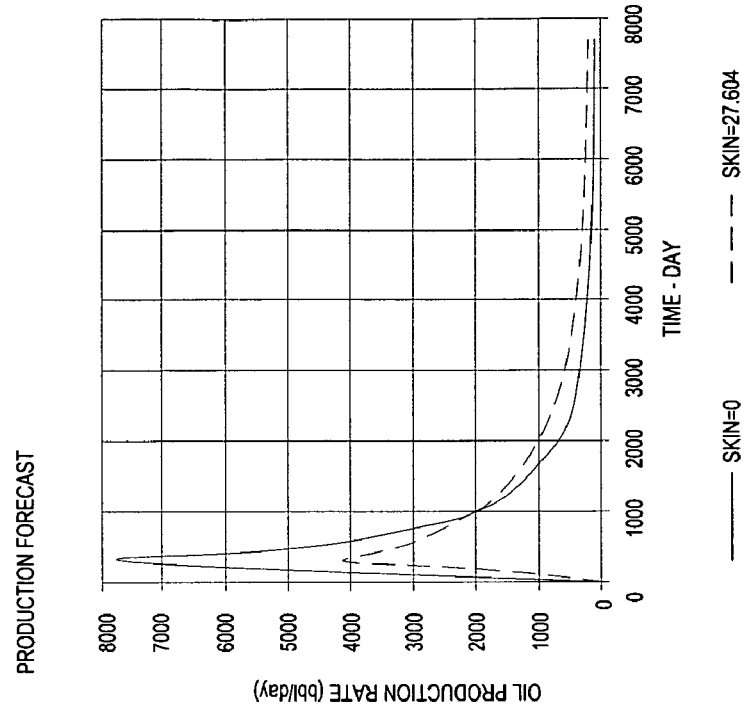

PROJECT SUMMARY
PROJECT NAME: HORIZONTAL OIL WELL LAST
FORMATION TYPE: SANDSTONE
RESERVOIR FLUID: OIL

WELL TYPE: HORIZONTAL
DRILLING APPROACH: CONVENTIONAL OVERBALANCED DRILLING
DRILLING FLUID: WATER BASED GEL CHEMICAL

PRODUCTION FORECAST

| FORMATION DAMAGE FORECAST | | |
|---|---|---|
| SOURCE OF DAMAGE | PERMEABILITY (mD) | RADIUS FROM WELLBORE FACE (cm) |
| SOLIDS INVASION | 0.706 | 5 |
| GLAZING | 20.000 | 5 |
| MASHING | 2.400 | 5 |
| PHASE TRAP (INVASION) | 20.000 | 5 |
| PHASE TRAP (IMBIBITION) | 20.000 | 5 |
| FINES MIGRATION | 15.038 | 5 |
| CLAY SENSITIVITY | 20.000 | 5 |
| WETTABILITY ALTERATION | 19.400 | 5 |
| ASPHALTENE PRECIPITATION | 20.000 | 5 |
| SCALE PRECIPITATION | 20.000 | 5 |
| EMULSION CREATION | 2.403 | |
| AVERAGE NEAR WELLBORE | 0.151 | |
| AVERAGE DEEP DAMAGE | 1.226 | |
| AVERAGE TOTAL DAMAGE | 1.209 | |
| UNDAMAGED ZONE | 20.000 | |

SKIN     27.604

FIG. 6

RISKED INPUT DATA

| DESCRIPTION | MIN | MODE | MAX | ESTIMATED |
|---|---|---|---|---|
| RESERVOIR PRESSURE (kPa) | 4800 | 5000 | 5200 | 5000 |
| LARGEST APERTURE OF FRACTURE (microns) | | | | |
| TYPE OF VUGS (PINPOINT=1,MEDIUM=2,LARGE=3) | | | | |
| IN-SITU HORIZONTAL PERMEABILITY (mD) | 0.5 | 0.500 | 0.5 | 0.50 |
| VERTICAL TO HORIZONTAL PERMEABILITY RATIO | 0.2 | 0.30 | 0.31 | 0.29 |
| DYNAMIC DRILLING PERIOD IN PAY SECTION (hrs) | 50 | 72 | 250 | 98.3 |
| NUMBER OF OB PULSE INCIDENTS DURING DRILLING | | | | |
| AMOUNT OF OB PRESSURE INCIDENTS (kPa) | | | | |
| DURATION OF OB PRESSURE PULSE INCIDENTS (hrs) | | | | |
| CIRCULATING OB PRESSURE (kPa) | -1000 | -1000 | -1000 | -1000 |
| MUD API FLUID LOSS - BASE SOLUTION ONLY (cc) | 10 | 10 | 10 | 10 |
| WATER SATURATION (FRACTION) | 0.1 | 0.1 | 0.1 | 0.1 |
| FORMATION POROSITY (FRACTION) | 0.05 | 0.05 | 0.05 | 0.05 |
| SKIN | 0.25 | 0.25 | 0.25 | 0.25 |

FIG. 7

SYSTEM FOR EVALUATING OVER AND UNDERBALANCED DRILLING OPERATIONS

CROSS-REFERENCE TO RELATED APPLICATIONS

This application claims the benefit of U.S. Provisional Patent Application No. 60/536,024, filed Jan. 13, 2004, which is herein incorporated by reference in its entirety.

BACKGROUND OF THE INVENTION

1. Field of the Invention

Embodiments of the present invention generally relate to completion of a well. More specifically, embodiments of the present invention pertain to analysis of different drilling methods used for completing a well.

2. Description of the Related Art

Historically, wells have been drilled with a column of fluid in the wellbore designed to overcome any formation pressure encountered as the wellbore is formed. This "overbalanced condition" restricts the influx of formation fluids such as oil, gas or water into the wellbore. Typically, well control is maintained by using a drilling fluid with a predetermined density to keep the hydrostatic pressure of the drilling fluid higher than the formation pressure. As the wellbore is formed, drill cuttings and small particles or "fines" are created by the drilling operation. Formation damage may occur when the hydrostatic pressure forces the drilling fluid, drill cuttings and fines into the reservoir. Further, drilling fluid may flow into the formation at a rate where little or no fluid returns to the surface. This flow of fluid into the formation can cause the "fines" to line the walls of the wellbore. Eventually, the cuttings or other solids form a wellbore "skin" along the interface between the wellbore and the formation. The wellbore skin restricts the flow of the formation fluid and thereby damages the well.

In conventional (overbalanced) drilling conditions, the drilling fluid penetrates the reservoir, damaging the near-bore formation and obstructing the flow of oil and gas into the wellbore. This formation damage limits the productivity of the well. The less oil and gas an operator recovers from a well, the less money returned on their investment. Several years ago, one major operator estimated the net potential cost of formation damage over the remaining life of all of their fields at $1.5 billion before taxes.

Underbalanced drilling operations lighten the hydrostatic pressure of the drilling fluid column so that the pressure in the wellbore is less than the formation pressure at all times. The lower pressure in the wellbore encourages the oil/gas to flow from the formation and virtually eliminates the flow of drilling fluids into the formation. This increases the reservoir's rate of production and maximizes the recovery of available reserves.

The industry uses a dimensionless number called the skin factor to measure the amount of formation damage. The skin factor represents the degree which a wellbore is lined with particulate matter. The skin factor is proportional to the steady state pressure difference around the wellbore. The skin factor is calculated to determine the production efficiency of a wellbore by comparing actual conditions with theoretical or ideal conditions. Over three years, the production value of a well with a skin factor of ten might be $60 million. If the same well were drilled underbalanced-leaving it with a skin factor of two—the production value would typically be 75 percent higher or $105 million over the same three-year period.

The costs for underbalanced drilling (UBD) are higher than the costs for overbalanced drilling. Taken alone however, when benefits directly attributable to underbalanced drilling are considered, such as increased rates of penetration (ROP) and more trouble-free rig time, underbalanced drilling proves to be the more cost-effective drilling method. Lighter drilling fluids mean faster drilling time. Faster drilling time means lower drilling costs. Underbalanced drilling has been proven to increase the ROP by 100-500 percent. For example, an operator in Venezuela estimated drilling time for a conventionally drilled well at 43 days. The well was later drilled underbalanced in 17 days.

A lost circulation zone can drive up the cost of any well. It results in lost fluid, the addition of lost circulation materials, slower drilling time, and the reconditioning of the drilling mud when the zone is passed through—all additional costs. If the lost circulation zone causes the pipe to stick, then the costs of the equipment lost in the hole, fishing operations, sidetracking, and rig downtime will also be incurred. Underbalanced drilling provides insurance against such drilling problems because the pressure in the annulus is never greater than the formation pressure, and therefore, the pressure differential neither pushes the drilling fluid into the reservoir nor draws the pipe to the formation.

For example, a conventionally drilled well in Wyoming suffered fluid losses of 40,000 barrels as well as differential sticking (the well was sidetracked three times). The budget overrun was $6 million. By comparison, an underbalanced well was drilled in the pay section, experiencing total fluid losses of only 200 barrels and no differential sticking. The well was drilled under budget.

Underbalanced drilling can also curtail expensive stimulation costs. Stimulations are usually conducted to get beyond formation damage or to create artificial permeability in low-permeability zones. Since underbalanced techniques decrease the amount of formation damage and encourage the oil and gas to flow from the reservoir, underbalanced drilling can reduce or eliminate the need of stimulation.

Formulas for calculating skin factor based on geological data, experience, core samples, etc., are well known in the art. Companies have also modified these formulas or formulated new ones based on experience which they most certainly regard as proprietary. Once the skin factor is calculated, a production curve can then be calculated. Combining the production curve with cost data will yield the net present value (NPV) of the well. Compounding this, though, is the fact that a lot of the factors that go into calculating the skin factor and the costs are fraught with substantial uncertainty. Thus, the uncertainty associated with the skin factor and costs calculations must be statistically analyzed or "risked", calculating skin factor and cost while varying the "riskable" parameters. Further, all of these calculations must be performed with all of the available completion methods, i.e., underbalanced and overbalanced completion, to enable selection of the best method.

Computer programs for performing at least some of these functions are also known in the art. However, performing all of these functions together involves splicing together numerous different computer programs and/or manual calculations, wasting valuable manpower. Thus, there is a need for a comprehensive computer program that allows a user to input all of the necessary data to perform rigorous skin factor calculations, cost analysis, flow projections, NPV analysis, and risking of all values associated with substantial uncertainty. Further, due to the uncertainty associated with many of the calculations, calibration of the software using data from existing wells would be very beneficial.

SUMMARY OF THE INVENTION

The present invention provides a method and software for evaluating different completion methods for a reservoir. More specifically, the invention is useful in selecting the most viable method to complete a wellbore.

Embodiments of the present invention may be implemented as a set of one or more (e.g., a suite of) application programs for use with a computer system. The application program(s) generally include sets of instructions defining operations of methods described herein and can be contained on any suitable type computer-readable medium. Examples of suitable type computer-readable media include, but are not limited to: read-only storage media (e.g., a CD-ROM or DVD), writable storage media (e.g., floppy disks, hard drives, CD-R/RWs), as well as information conveyed to a computer by a communications medium, such as through a computer network, including wireless networks and the Internet.

In an exemplary arrangement, an interface is provided allowing a user to enter reservoir data. The method further comprises providing an interface allowing a user to enter parameters related to a first drilling technique. A first skin factor is then generated based on the reservoir data and the drilling parameters. Preferably, a first set of production data is then calculated from the first skin factor. Optionally, an interface is provided allowing the user to enter cost data related to the first drilling technique and a first total cost is generated. The production and the total cost related to the first technique can be combined and a report indicating the economic impact of drilling the reservoir using the first completion technique can then be generated.

Preferably, the user can enter ranges of the reservoir and/or cost data, referred to as "riskable" parameters, that are subject to considerable uncertainty and multiple total costs and/or skin factors can be calculated through multiple iterations. Risked production data can be calculated from the multiple skin factors and combined with the multiple total costs to yield risked net revenue data and a risked net present value. The entire process may be completed with alternate completion methods. The economic data resulting from each completion method can then be combined for comparison by the user. The user can then select the most feasible option and complete the wellbore.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates an exemplary GUI screen of a historical database.

FIG. 5 displays an exemplary GUI screen of a formation data input module.

FIG. 6 displays an exemplary GUI screen of a skin factor calculation and a production curve.

FIG. 7 displays an exemplary GUI screen of a skin factor calculation and a production curve.

DETAILED DESCRIPTION OF THE PREFERRED EMBODIMENT

The present invention provides an improved method and software for evaluating completion of a wellbore. The invention employs extensive input and calculation modules as a means for efficiently comparing alternative methods of completion.

Figure 1A:
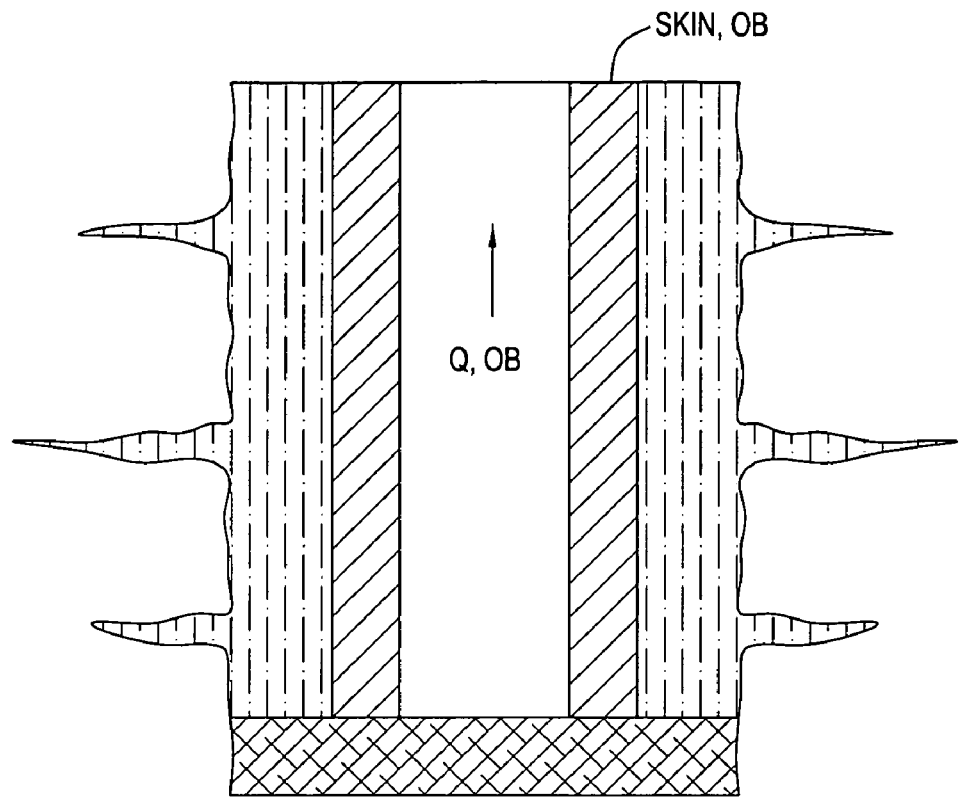
FIGS. 1A and 1B are cross sections of a well completed with overbalanced and underbalanced techniques, respectively.
Figure 1B:
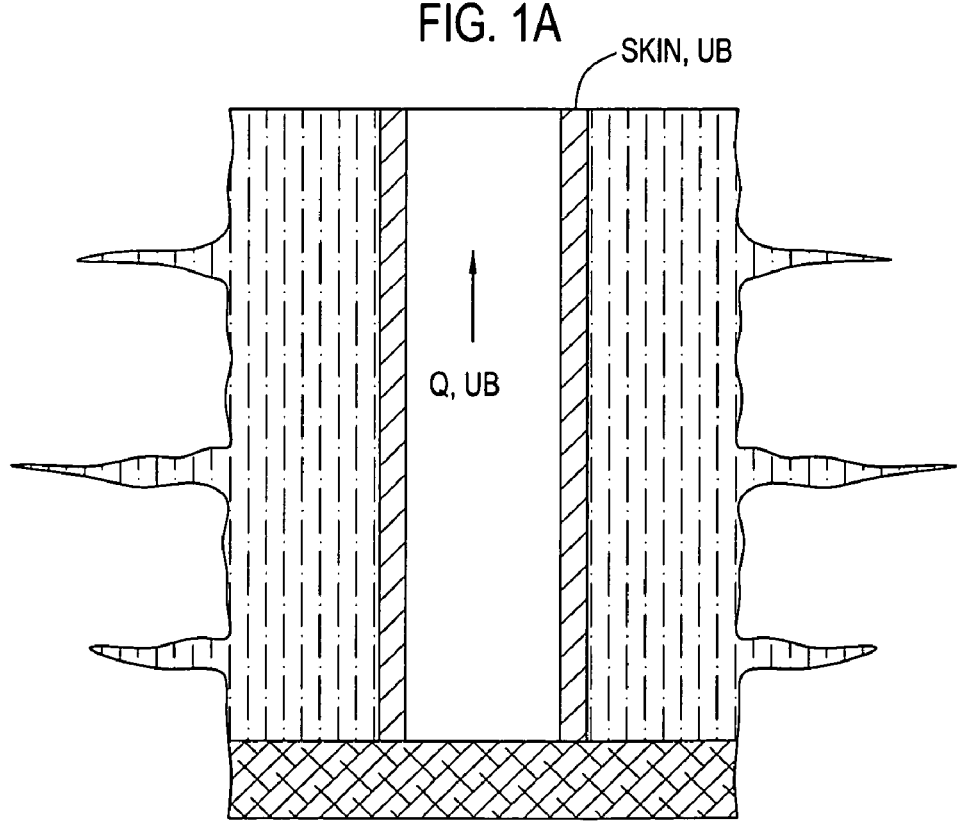

FIGS. 1A and 1B depict a wellbore completed using overbalanced and underbalanced techniques, respectively. As discussed above, overbalanced completion results in more skin damage to the producing formation than does a well completed using underbalanced techniques. Thus, the flow rate, Q, for a given well, will be lower for the well completed by overbalanced drilling compared to the same well completed with underbalanced techniques.

For sake of convenience, the software of the preferred embodiment discussed below shall be referenced in modules. These modules are the input, calculation, and risk modules.

Figure 2:
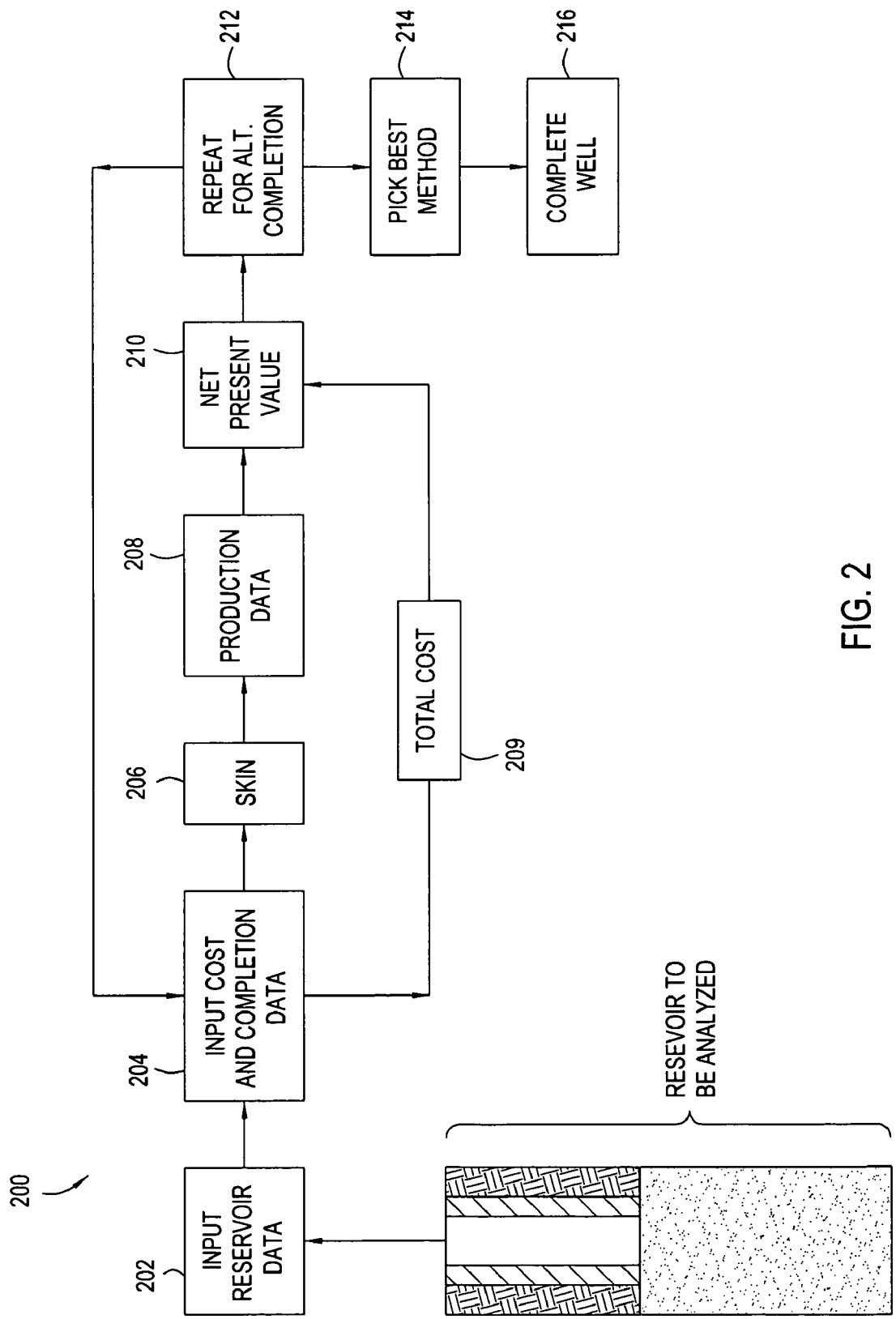
FIG. 2 is a flow diagram of exemplary operations of methods employed in the current invention.

FIG. 2 is a flow diagram of exemplary operations 200 for selecting a completion method (i.e., underbalanced or overbalanced) according to aspects of the present invention. A reservoir is shown ready for completion. At step 202, the reservoir data, such as formation depth, formation type, and fracture or vug data, is entered into the input module of the present embodiment. At step 204, necessary cost and completion data for one type of drilling method for completion (e.g., overbalanced). The software then calculates the skin factor, at step 206, and total completion cost, at step 209, that would result from using the selected completion method. From the skin factor, the software then generates production data at step 208, such as initial flow rate, flow decline, and cumulative production. The software combines the total completion cost data and the production data at step 210 to generate a net present value (NPV) for the well completed with the selected completion method.

At step 212, the process is then repeated for any/all alternate completion methods (i.e., underbalanced). The NPVs of the two completion methods can be compared at step 214 to select the better method of completion. At step 216, the well is then completed with the better method.

Figure 3:
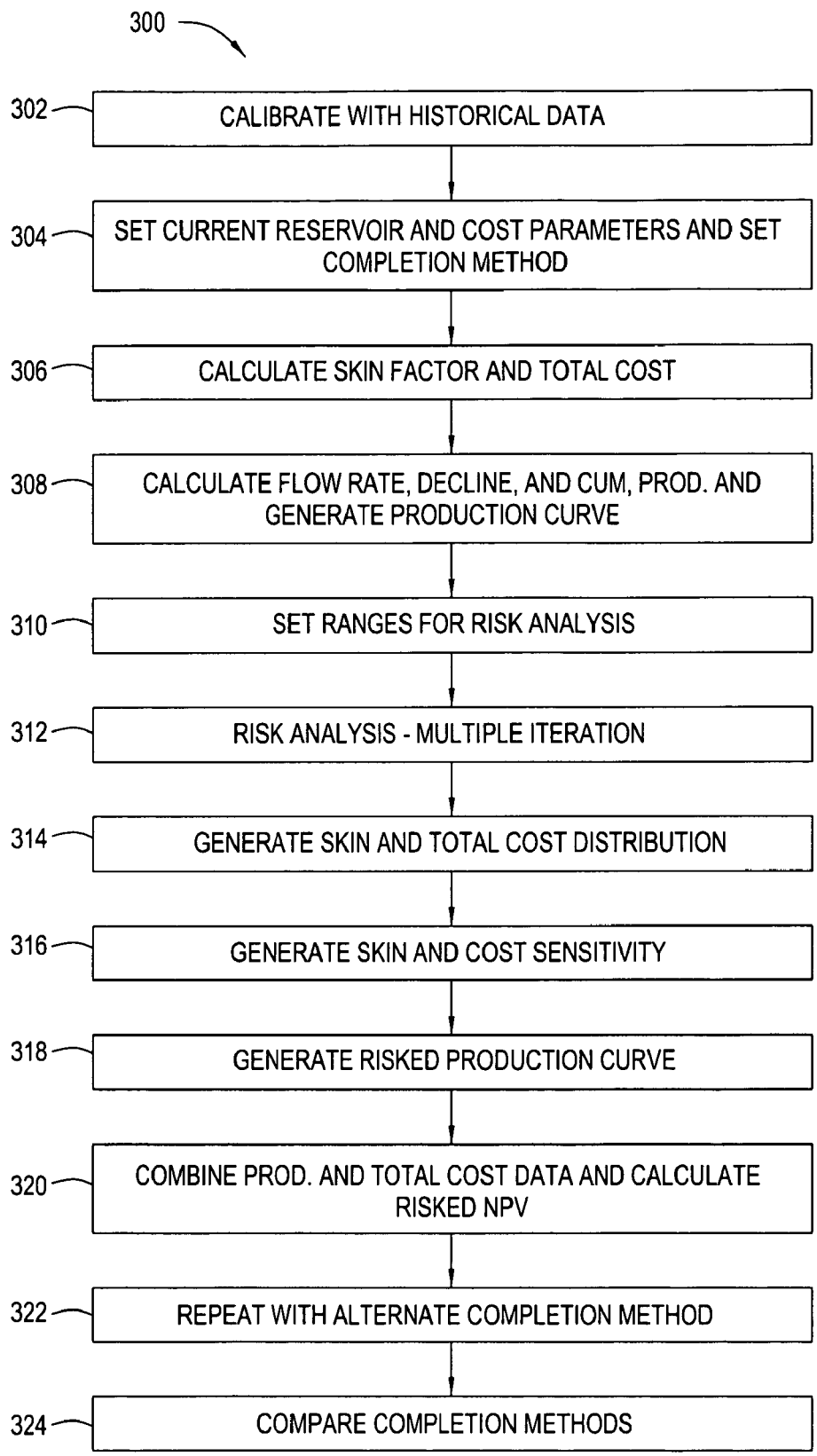
FIG. 3 is a detailed flow diagram of exemplary operations of methods employed in the current invention.

FIG. 3 is a flow diagram of exemplary operations 300 for completion analysis according to the present invention. Once a wellbore is ready to be completed, the software is first run on past-completed wells at step 302, similar to the wellbore at hand, to see if the total completion cost and skin factor calculations are accurate. For example, the data for past-completed wells may be stored in a historical database module of the software. If the predictions are not accurate, the cost estimation and/or skin factor calculation modules can be configured until they conform to actual results.

FIG. 4 is an exemplary screen of a historical database illustrating some of the information that may be stored. In the screen shot, reservoir and production data is shown for a past-completed well. First seen in the screen shot is a list of wells for which data is contained providing the well name and record number. There is also a section of the screen for individual data for a particular well. This section comprises four subsections: general well data, production zone data, pressure data, and production data. The general well data subsection comprises data for country, province/state, county/parish, and well name. The production zone subsection comprises data for latitude, longitude, TV depth, KB elevation, sub sea depth, R/R date, license date, and on production date of a selected production zone for the particular well. This subsection also comprises a scroll bar for selecting through the various production zones. This subsection also comprises data (not shown) for the drilling approach used (i.e., underbalanced or overbalanced), the orientation (i.e., vertical or horizontal), and the name of the selected production zone. This data is also reproduced (shown) above the pressure data and production data subsections. The pressure data subsection comprises data for test identification, date, type, shut in time, well head pressure, and run depth for the selected production zone. This subsection also comprises a scroll bar for selecting through multiple sets of pressure data for a selected production zone. The production data subsection comprises data for year, month, production time, oil production, gas production, and water production of the selected production zone. The historical database may also store other data collected from the past-completed well, such as completion cost and/or skin factor(s).

At step 304 the reservoir, completion, and cost parameters are entered into graphical user interface (GUI) screens of the input module for the set completion method (i.e., overbalanced) of the well being analyzed.

Calculation Module

The calculation module is comprised of skin factor and cost estimation sub-modules. The skin factor calculation and cost estimation sub-modules at step 306 then calculate the skin factor and total cost, respectively, for the set completion method (i.e., overbalanced) of the well being analyzed. From the skin factor and other parameters, the program at step 308 then calculates an initial flow rate, flow decline data, and cumulative production data for completion of the well using the set completion method. The program can calculate and generate a gross revenue curve from the cumulative production results.

FIG. 6 is an exemplary skin factor output screen. Preferably, the software calculates skin factor by combining several different forms of skin damage. These different forms may include, but are not limited to solids invasion, glazing, mashing, phase trap (invasion), phase trap (inhibition), fines migration, clay sensitivity, wettability alteration, asphaltene precipitation, scale precipitation, and emulsion creation. Also calculated and displayed is the radius of damage into the wellbore wall for each form of damage and for the overall skin factor.

The weight each form of damage contributes to the overall skin factor can be changed by altering the weighing factor, displayed in the Figure. A form of damage can be entirely excluded by setting the weighing factor to zero. The program also calculates and displays both permeability and radius of damage for average near wellbore, average deep damage, average total damage, and undamaged zone. This screen also contains a production curve calculated from the skin factor.

As discussed above, the different forms of skin damage can be calculated from formulas known in the art or proprietary ones. Also, more or less forms of damage can be used to calculate the skin factor without deriving from the scope of the invention.

Risk Module

At step 310, the estimated ranges for well data and cost variables associated with substantial uncertainty ("risked variables") are then entered into a GUI screen. Preferably, the ranges are actually entered when the well and cost parameters are entered in the input module. For some embodiments, these ranges may be entered via a tabbed Risked Reservoir Variables sub-module GUI screen of the input module, such as that illustrated in FIG. 7, and the Time Estimates, Cost Estimates, and Correlations sub-portions of the Cost sub-module of the input module (not shown).

The Risked Reservoir Variables, contained in FIG. 7, sub-module provides three sub-portions for skin, NPV, and correlations. The skin sub-portion comprises min., mode, and max. inputs for reservoir pressure, largest aperture of fracture, type of vugs (i.e., pinpoint, medium, or large), in-situ horizontal permeability, vertical to horizontal permeability ratio, dynamic drilling period in pay section, number of tripping operations, number of OB pulse incidents during drilling, amount of OB pressure incidents, duration of OB pressure pulse incidents, circulating OB pressure, mud API fluid loss—base solution only, water saturation fraction, and formation porosity fraction. For each variable, the program calculates and displays an estimation from the inputs. The program also calculates and displays a min., mode, max., and estimated skin from the inputs. The NPV sub-portion (not shown) comprises inputs for unit price and discount rate. The correlations sub-portion (not shown) comprises inputs for correlating factors that correlate each of the variables inputted in the skin sub-portion to one another.

The Time Estimates sub-portion of the Cost sub-module (not shown) comprises min., mode, and max. time inputs; probability, maximum incidents, and additional cost inputs; and estimated time and estimated cost outputs for drilling casing exit/curve (time only), time to drill reservoir section (time only), rig crew efficiency fraction (time only), slide, stuck in hole, lost circulation, surface equipment failure, drillstring problems, BHA failure (outputs time, no inputs), completion, and equipment logistics time. The sub-portion also outputs times and costs for dynamic drilling period, total estimated drilling, and total estimated drilling and completion calculated from the data inputted into the sub-portion. The Cost Estimates sub-portion (not shown) comprises min., mode, and max. drilling cost inputs; min., mode, and max. completion cost inputs; and estimated drilling cost and estimated completion cost outputs for daily drilling cost, location, bits, casing and liners, cement, mob/de mob, formation evaluation, other costs, additional personnel, top hole cost, casing, wellhead equipment, and other equipment. The program also calculates and displays total estimated drilling cost and total estimated completion cost from data entered into the sub-portion. The correlations sub-portion comprises inputs for correlating factors that correlate each of the variables inputted in the time estimates sub-portion to one another (time and probability, if applicable).

Figure 8:
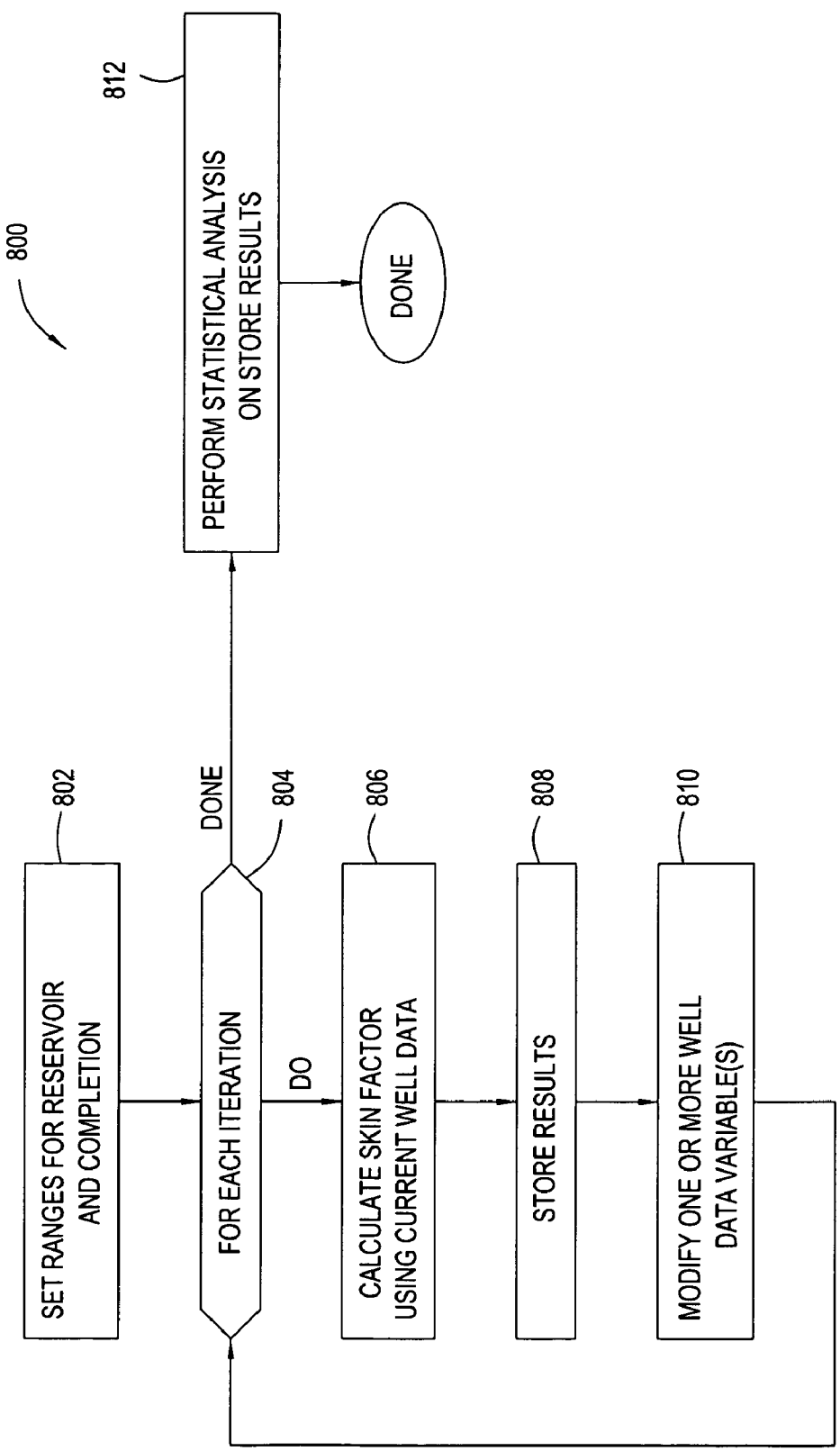
FIG. 8 is a flow diagram of exemplary operations for skin factor risk analysis.

At step 312, the program then runs through multiple iterations, varying one or more variable(s) by a set increment and calculating a skin factor, total cost, and production curves for each iteration of each variable until all possible combinations have been exhausted. FIG. 8 is a flow diagram of exemplary operations 800 for a skin factor risk analysis. Once the user has entered the ranges for selected inputs at step 802 affecting the skin factor, the software begins iterating through the ranges of the input variables at step 804, calculating a skin factor during each iteration at step 806. Production data may also be calculated during this step. The results of each iteration are stored at step 808 for later analysis. Then one or more of the variable(s) are modified at step 810 according to known statistical techniques, such as a Monte Carlo technique. When the loop is completed at step 812, the software can then calculate and generate skin distribution, skin sensitivity, and risked production curves. The software can also perform a similar process to calculate a risked total cost.

Figure 9:
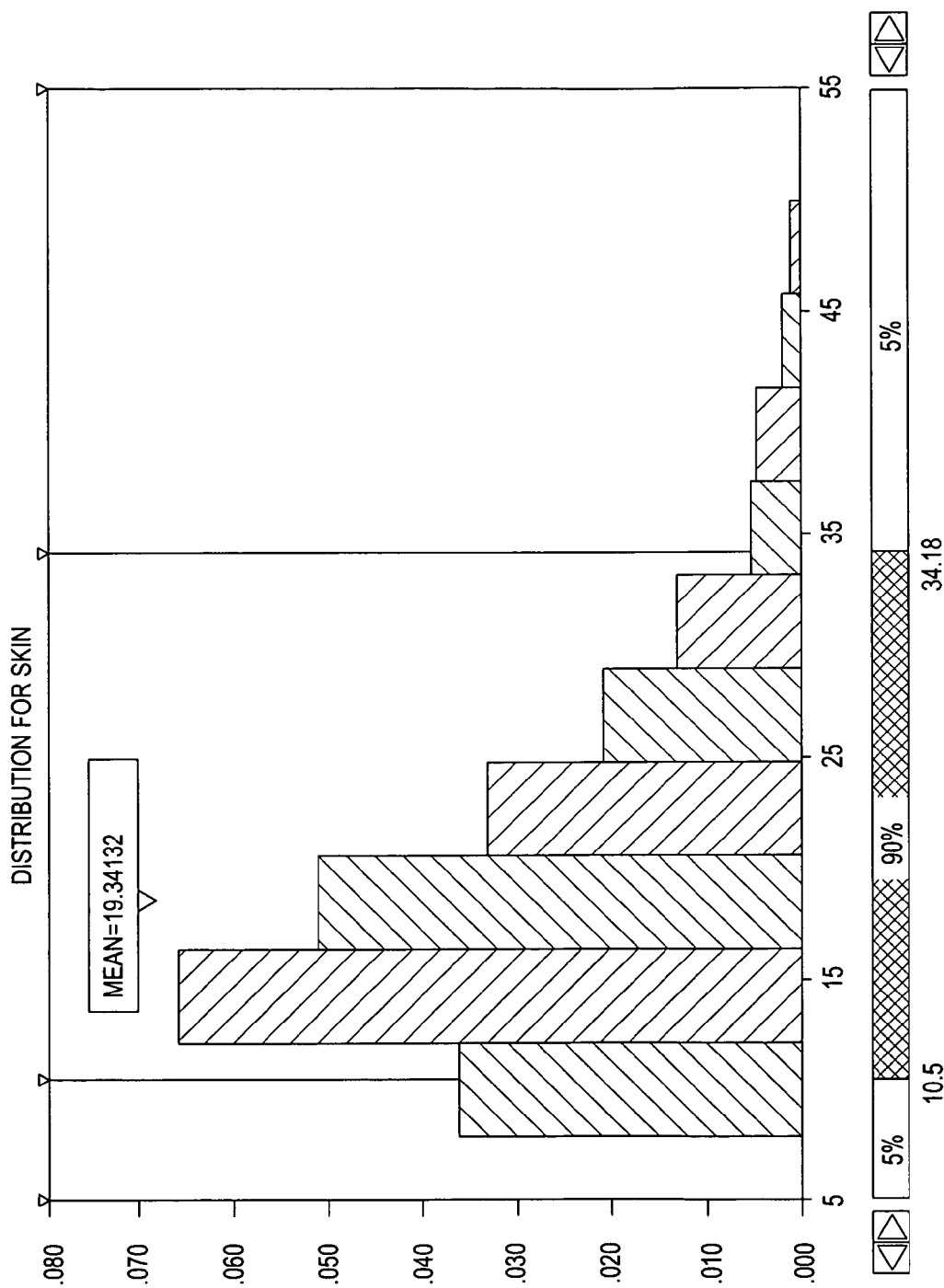
FIG. 9 is an exemplary skin distribution curve generated using the operations of FIG. 8.
Figure 10:
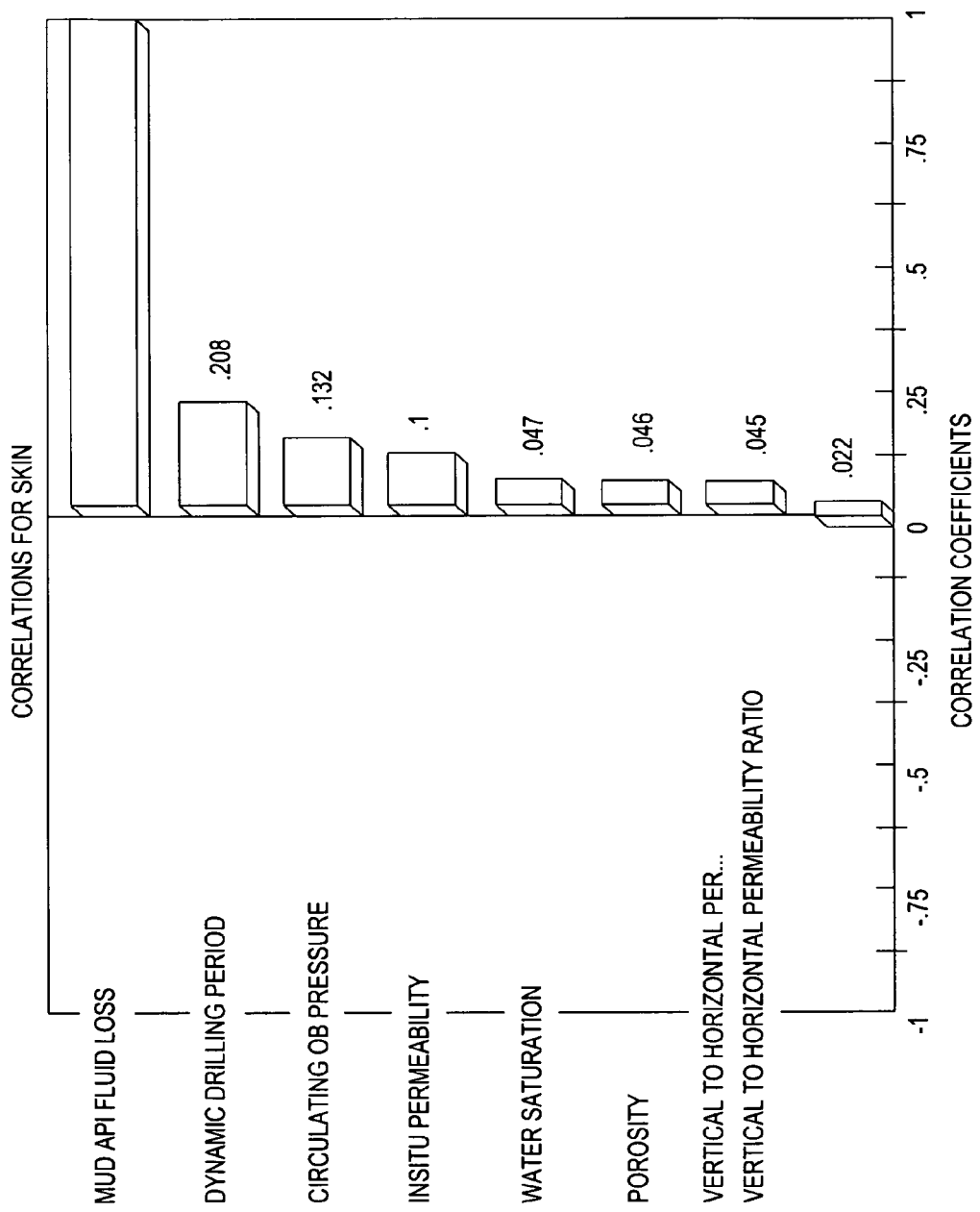
FIG. 10 is an exemplary skin sensitivity curve.

At steps 314, 316, and 318, the program then assembles the risked skin and total completion cost data and generates a skin distribution and sensitivity chart, a total cost distribution and sensitivity chart, and a risked production curve (and/or gross revenue curve). FIG. 9 is an exemplary skin distribution graph generated by the software from the results of the skin factor risk analysis. From the graph, the user can gauge the variance in the skin factor resulting from the ranges of the riskable input factors. A similar curve can be calculated and generated with total cost. FIG. 10 is an exemplary skin correlation graph generated by the software from the results of the skin factor risk analysis. From the graph, the user can see the relative effect of each of the riskable input variables on the skin factor. Thus, investment in one area may be warranted to control a parameter that has a great impact on the skin factor. A similar graph can be calculated and generated with total cost.

Figure 11:
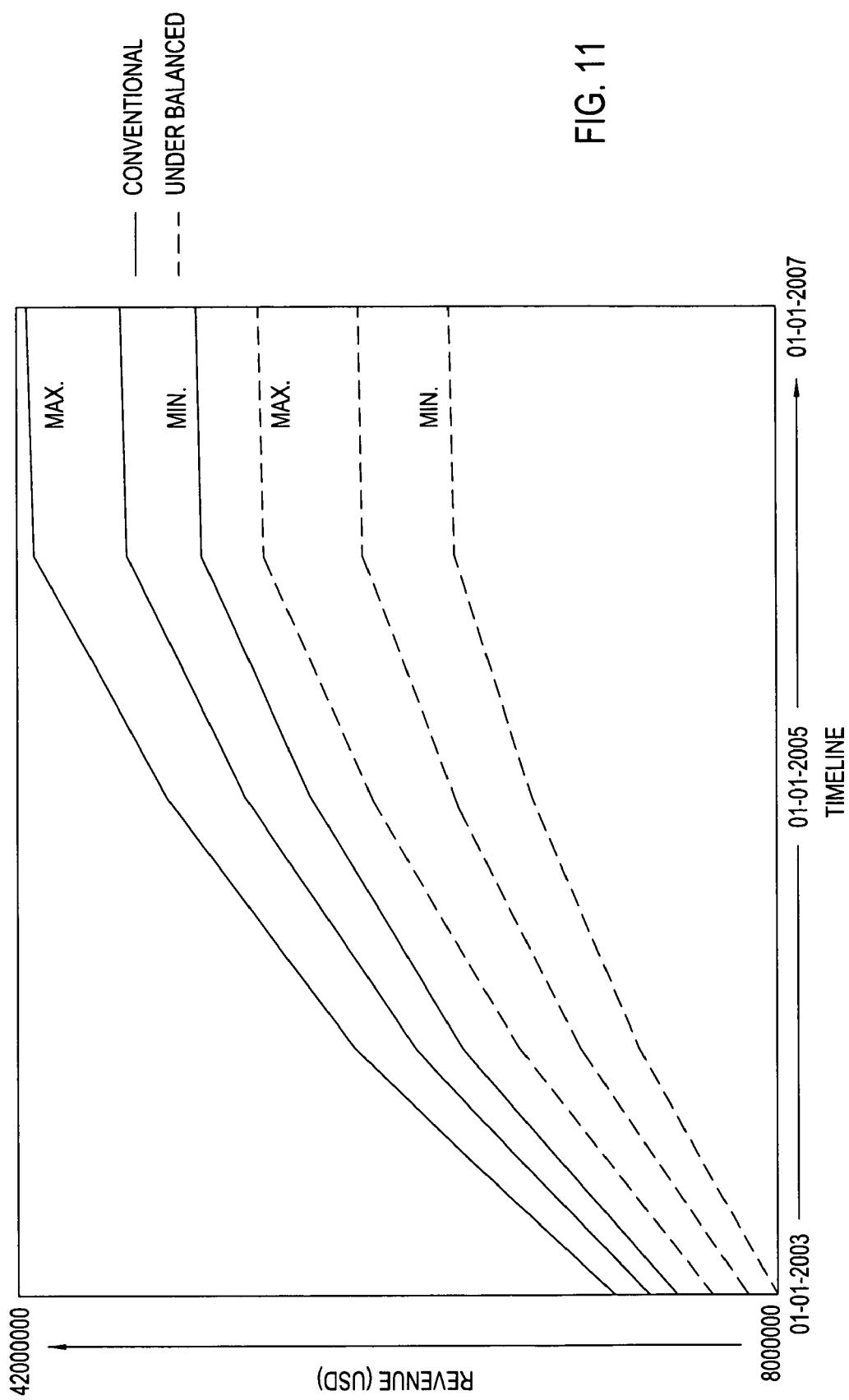
FIG. 11 is an exemplary risked net revenue curve for completion using both overbalanced and underbalanced completion techniques.
Figure 12:
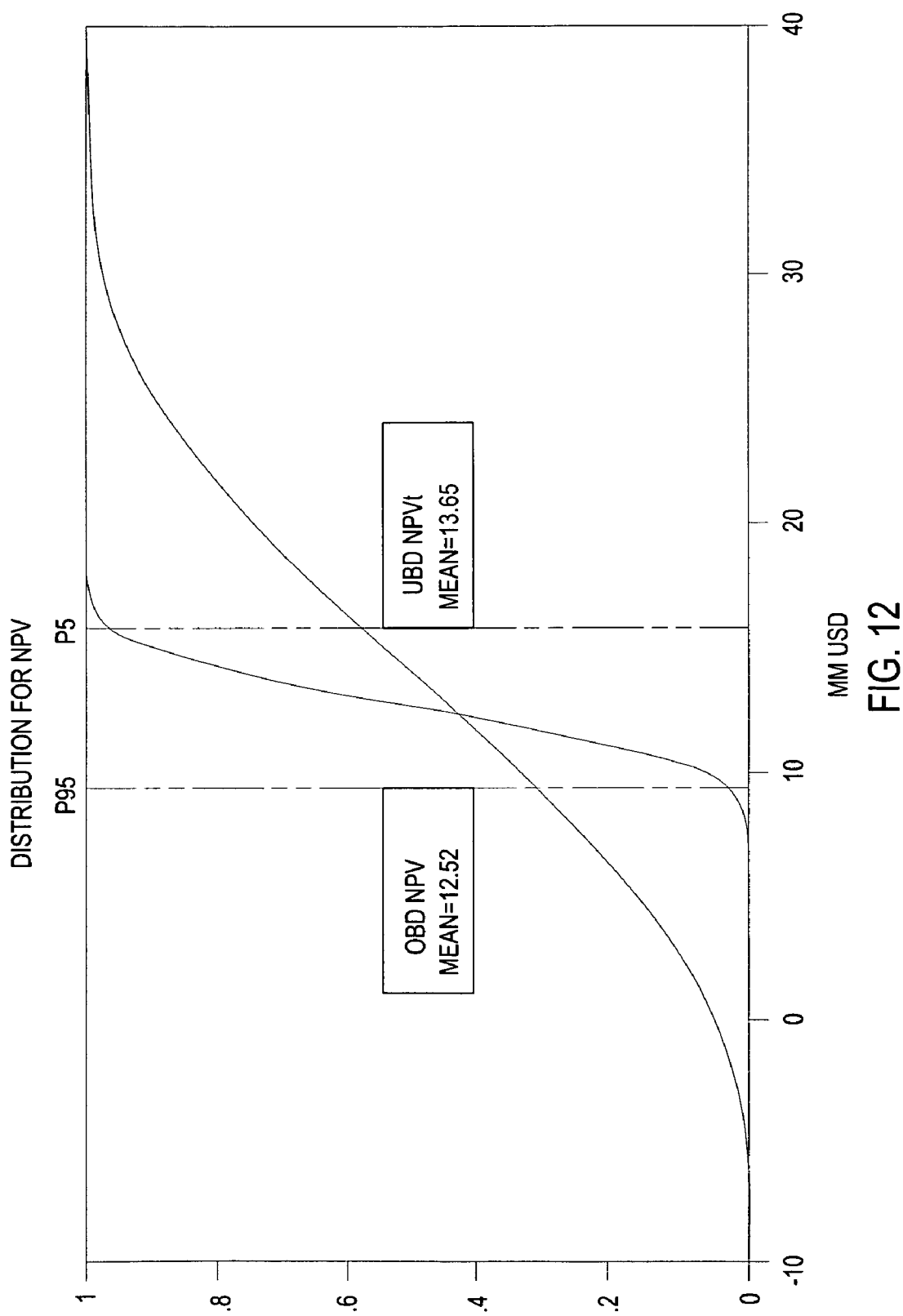
FIG. 12 is an exemplary risked NPV curve for completion using both overbalanced and underbalanced completion techniques

At step 320, the program then combines the risked production and total completion cost results and calculates a risked NPV and/or calculates and generates a net revenue curve. FIG. 11 contains two sets of exemplary risked net revenue curves, one for overbalanced completion and one for underbalanced completion. From these curves, the user can compare the two different techniques for completing the well. FIG. 12 contains two exemplary NPV distribution curves, one for overbalanced completion and one for underbalanced completion. From these curves, the user can compare the two different techniques for completing the well, gauge the variance in the NPV resulting from risking the input variables, and select the most advantageous completion method.

At step 322, the entire process is then repeated for any/all alternate completion methods (i.e., underbalanced). At step 324, the software then combines the results for comparison by the user.

Input Module

Preferably, the input module comprises several sub-modules. These include, but are not limited to, formation, well data, drilling fluid, reservoir, formation damage, flow module, risked reservoir variables, and cost modules. Preferably, each sub-module can be accessed on the GUI screen by clicking on a tab. Each sub-module may further comprise multiple sub-portions and sub-parts also accessible by tabs or check-boxes. The input blanks may be configured to allow data to be typed in, comprise a pull-down box, or comprise a fill-dot selection.

FIG. 5 is an exemplary GUI screen of the Formation sub-module of the input module. The screen displays a typical Formation sub-module further comprising a basic core data, X-ray data, fracture data, and vug data sub-part. The Basic Core Data sub-part is selected in the screen shot. Seen FIG. 5 are inputs for formation name, top depth, base depth, net to gross pay, net pay, current reservoir pressure, current reservoir temperature, formation O-W contact angle, and formation type (sandstone, limestone, dolomite, granite, or evaporate). The "Formation is" check-box activates the fracture data and/or vugs data sub-parts depending on the selection. The Fracture Data sub-part contains inputs for smallest aperture of fracture, largest aperture of fracture, most frequently occurring fracture size, fracture density, and fracture orientation. The Vugs Data sub-part provides inputs for type of vugs and frequency vugs. The tabbed Basic Core Data sub-part provides inputs for sample number, interval, $K_h$, $K_v$, and Phi. The tabbed X-ray Data (not shown) sub-part allows inputs for a bulk x-ray data analysis comprising percentages of quartz, calcite, dolomite, anhydrite, pyrobitumen, and total clay; a clay fraction analysis comprising percentages of kalonite, illite, chlorite, smectite, and mixed layer clay; cement type; and degree of cementation.

The tabbed Well Data sub-module (not shown) provides inputs for well name, well location, type of well (horizontal, vertical, etc.), well orientation, well size, completion type, perforation charge size, shot density, completion method (overbalanced, underbalanced, etc.) planned stimulation type, depth of stimulation, completion fluid, completion overbalanced pressure, fracture gradient, surface casing size, surface casing top depth, surface casing base depth, intermediate casing size, intermediate casing top depth, intermediate casing base depth, open hole size, open hole top depth, open hole base depth, primary producing phase, aquifer in contact with pay zone, gas cap in contact with oil leg, total length of well in contact with gross pay, well overall drainage area, length to width ratio of drainage area, length of drainage area, width of drainage area, X-coordinate of horizontal well, Z-coordinate of horizontal well, Y1-coordinate of horizontal well, and Y2-coordinate of horizontal well.

The tabbed Drilling Parameter sub-module (not shown) provides inputs for desire drilling approach (conventional overbalanced, low head overbalanced, flow drilling, or induced underbalanced), solids control type (double centrifuge, centrifuge, shaker, or none), expected average ROP while drilling, bit type proposed for use, duration of dynamic drilling period in pay section, duration of shut in period after drilling, hole cleaning effectiveness, number of tripping operations, estimated friction pressure component, calculated static BH pressure, calculated static OB pressure, calculated circulating BH pressure, calculated circulating OB pressure, number of OB pulse incidents during drilling, duration of OB pressure pulse incidents, average value of OB pressure incidents, BH pressure during drilling operation, surface back pressure to be maintained, and desired amount of UB pressure.

The tabbed Drilling Fluid sub-module (not shown) provides inputs for drilling fluid (water based clear fluid, water based polymer, water based polymer and starch, water based gel chemical, aphron, water based foam, pure oil based, invert emulsion oil based, oil based foam, oil-gas energized system, water-gas energized system, water based mutual solvent, mist drilling water, mist drilling oil, pure air, pure nitrogen, pure natural gas, or pure flue gas. The sub-module contains three tabbed sub-portions for Basic Drilling Fluid Data, Additives and Solids, and Filtrate Analysis. The Basic Drilling Fluid Data sub-portion contains inputs for nominal density of the circulating mud at average TVD, including entrained gas, if present; mud API fluid loss of base solution only; gas phase type; base fluid injection rate; base gas injection rate; mud name; mud supplier; mud PV for base solution only; mud YP for foaming base solution only; mud HPHT fluid loss for base solution only; and mud filtrate oil-water contact angle. The Additives and Solids sub-portion contains inputs for additive name, additive concentration, concentration units, artificial bridging agent type, artificial bridging agent concentration, artificial bridging agent concentration units, amount of hydrophobic additives, particle size of median size mud solids, particle size of median size bridging agent, particle size of D10 size mud solids, particle size of D10 size bridging agent, particle size D50 size mud solids, particle size of D50 size bridging agent, particle size of D90 size mud solids, particle size of D90 size bridging agent, and mass percentage of total mud solids content. The Additives and Solids sub-portion comprises inputs for $N_2$, $CO_2$, $H_2S$, $C_1$, $C_2$, $C_3$, $C_4$, $IC_4$, $NC_4$, $IC_5$, $NC_5$, and $C_6+$ components of pure gas mud filtrate and oil base mud filtrate. For water base mud filtrate, the inputs provided are for cations Na, K, Ca, Mg, Ba, Sr, Fe, and Mn; anions Cl, I, $HCO_3$, $SC_4$, OH, $CO_3$, and $H_2S$; PH; total dissolved solids; viscosity; and density.

The tabbed Reservoir sub-module (not shown) provides five tabbed sub-portions for Reservoir Fluids, In-Situ Permeability, Capillary Pressure, Relative Permeability, and Reservoir Problems. The Reservoir Fluids sub-portion comprises inputs for $N_2$, $CO_2$, $H_2S$, $C_1$, $C_2$, $C_3$, $C_4$, $IC_4$, $NC_4$, $IC_5$, $NC_5$, and $C_6+$ components of gas, dead oil, and recombined phases of the reservoir fluid. The sub-portion further provides three tabbed sub-parts for Oil, Gas, and Formation Water. The Oil sub-part comprises inputs for oil API gravity, specific gravity of solution gas, separator GOR, separator pressure, separator temperature, dead oil viscosity at reservoir temperature, date of PVT study, PVT study conducted by, PVT study report number, formation sampled, well location sampled, bubble point pressure, sample analyzed (i.e., recombined), and paraffinic oil (cloud point greater than water freezing temperature). Also, the sub-part comprises inputs for P, Do, Vo, Bo, GOR, Z, Sg, and Bg components of differential liberation data. The Gas sub-part comprises inputs for condensate gas ratio, dew point pressure, and max. liquid dropout. The Formation Water sub-part comprises inputs for cations Na, K, Ca, Mg, Ba, Sr, Fe, and Mn; anions Cl, I, $HCO_3$, $SC_4$, OH, $CO_3$, $H_2S$, and F; PH; total dissolved solids; viscosity; and density. Also, the sub-part comprises inputs for P, Do, Vo, Bo, GOR, Z, Sg, and Bg components of differential liberation data. The In-Situ Permeability sub-portion comprises inputs for in-situ permeability options (i.e., user input), average in-situ horizontal permeability of producing zone, estimated vertical to horizontal permeability ratio, average formation porosity, and desired net overburden pressure. From these inputs, the program can calculate and display calculated reservoir net overburden pressure in this sub-portion. The capillary pressure sub-portion comprises an option to import raw air-mercury pressure data (Pc and Sair) for the target formation or the user can use library data from a database contained in the software. The sub-portion also provides inputs for is reservoir in capillary equilibrium with a free water contact, distance of the mapped water oil or gas oil contact to the midpoint of the oil or gas production interval, estimated swi from capillary pressure data, estimated swi from log data or traced core analysis, correlation of measured log sw with porosity, oil-water interfacial tension, gas-water interfacial tension, and formation wettability. From these inputs, the program can calculate and display estimated formation wettability, calculated <1 micron percent micorpores, calculated 1-3 micron percent micorpores, and calculated >3 micron percent micorpores. The Reservoir Permeability sub-portion comprises an option to enter relative permeability data (Sw, Knw, and Kro), have the program calculate relative permeability from provided inputs for shape exponents, or use library data from a database contained in the software. The provided inputs for shape exponents are water shape factor (1-10), oil shape factor (1-10), desired initial water saturation at Kro=1, critical water saturation, maximum water saturation, and endpoint water relative permeability. The sub-portion also contains an option to have the software normalize the relative permeability data to average initial water saturation. The Reservoir Problems sub-portion comprises location (i.e., at surface, in tubing, or downhole), severity (i.e., moderate, mild, or severe), and type (i.e., oil in water, water in oil, or gas in oil) inputs for wax and paraffin problems, emulsion problems, asphaltene deposition issues, scale problems, and bacterial induced damage.

The tabbed Formation Damage sub-module (not shown) provides five tabbed sub-portions for Drilling Fluid Leakoff Data, Phase Trap Test Data, Fines Migration, Water Sensitivity, and Fluid Compatibility. The Drilling Fluid Leakoff Data sub-portion provides an option to enter drilling mud leakoff testing on formation core data or to use analog data contained in the software. If testing data is used, the sub-module provides inputs for a leakoff test validity check further providing inputs for wettability restored or preserved state core, corrected initial saturations, reservoir temperature used, correct overbalanced pressure used, drilling mud used same as evaluated here, mud fluid loss and solids content compatible, and mud contained drilling solids. Also, the sub-module comprises inputs for core sample number, core length, core diameter, base mud name and type, underbalanced pressure used, and overbalanced pressure used. Further, the sub-module provides pressure and permeability inputs for initial undamaged permeability at max. drawdown pressure, threshold permeability post UB mud flow initiation, permeability at max. drawdown regain pressure post UB, threshold permeability post OB mud pulse, and permeability post max OB pulse drawdown regain pressure. Even further, the sub-module provides cumulative fluid loss inputs for measurements taken at 30, 120, 180, 210, and 240 minutes. The Phase Trap Test Data sub-portion provides a phase trap test validity check further comprising inputs for phase trapping fluid is water, wettability restored or preserved state core, corrected initial saturations, reservoir temperature used, and core permeability representative of formation of interest. Further, the sub-portion comprises pressure, permeability, gas saturation fraction, oil saturation fraction, and water saturation fraction inputs for initial undamaged core and test conditions, at phase trap fluid mobilization threshold (pressure and permeability only), post phase trap maximum pressure, and core sample length (pressure only). The Fines Migration Data sub-portion provides inputs for displacing fluid for fines migration test, was a fines migration problem present, critical interstitial velocity when fines migration occurred, and percent maximum reduction in base permeability. The Water Sensitivity sub-portion provides salinity, divalent ions, total cat ions, PH, and percent reduction in permeability inputs for formation water and mud filtrate. The Fluid Compatibility sub-portion comprises available fluid compatibility data for the drilling filtrate and formation fluids inputs for type(s) of data available (i.e., filtrate water-formation), incompatibility (i.e., mild), and emulsion problem (i.e., severe).

The tabbed Flow Module sub-module (not shown) provides four sub-portions for Boundary Conditions, Simulation Time, Relative Permeability Data of Reservoir Fluid, and Optional Data. The Boundary Conditions sub-portion comprises inputs for maximum flow rate, initial reservoir pressure, and flowing bottom-hole pressure. The Simulation Time sub-portion comprises inputs for start year, stop year, and time step. The relative permeability data of reservoir fluids sub-portion comprises inputs for critical gas saturation, residual oil saturation, oil end point relative permeability, and gas end point relative permeability. The Optional Data subportion comprises inputs for comparable skin factor.

The tabbed Risked Reservoir sub-module is discussed above with the Risk module.

The tabbed Cost sub-module (not shown) provides four tabbed sub-portions for Drilling Reservoir Section, Time Estimates, Cost Estimates, and Correlations. The Drilling Reservoir Section sub-portion comprises 5 sub-parts for lateral section, tripping data, lateral time, tripping time distribution, and trip counter. The lateral section sub-part provides inputs for expected average ROP and lateral length. The Tripping Data provides inputs for initial trip length (no snubbing), length of trip #1, length of trip #2, length of trip #3, average tripping speed, average tripping speed using snubbing, and start depth for snubbing. The program calculates and displays final trip length from the inputs. The Lateral Time sub-part provides inputs for time spent on build-up test and time spent on flow test. From the inputs, the program calculates and displays expected drilling time and time spent tripping. The Tripping Time Distribution sub-part provides outputs for min., mean, and max. calculated from data inputted into the sub-portion. The Trip Counter sub-portion provides inputs for completion trips and formation evaluation trips and outputs for planned trips, unscheduled trips, and total trips calculated by the program from data inputted into the sub-portion. The Time Estimates, Cost Estimates, and Correlations sub-portions are discussed above with the Risk module.

The input module, described above, is only for a preferred embodiment of the present invention. Depending on formulations used to calculate skin factor, individual well conditions, and individual user preference, some sub-modules, sub-portions, sub-parts, and/or individual inputs may be increased, reduced, or entirely eliminated.

While the foregoing is directed to embodiments of the present invention, other and further embodiments of the invention may be devised without departing from the basic scope thereof, and the scope thereof is determined by the claims that follow.

The invention claimed is:

1. A method of drilling of a reservoir, comprising:
   entering reservoir data using a computer system or a computer;
   entering parameters of a first drilling technique using the computer system or the computer;
   generating, by the computer system or the computer, a first skin factor based on the reservoir data and the parameters of the first drilling technique;
   entering parameters of a second drilling technique using a computer system or the computer;
   generating, by the computer system or the computer, a second skin factor based on the reservoir data and the parameters of the second drilling technique;
   comparing the drilling techniques using the first and second skin factors and selecting one of the first or second drilling techniques; and
   drilling the reservoir with the selected technique.

2. The method of claim 1, wherein the method further comprises: generating a first set of production data from the first skin factor.

3. The method of claim 2, wherein the method further comprises: entering cost data of the first drilling technique and generating a first total cost based on the cost data.

4. The method of claim 3, wherein the method further comprises: combining the production data and the total cost data and generating a report indicating an economic impact of drilling the reservoir using the first drilling technique.

5. The method of claim 1, wherein the method further comprises:
   entering a range of one or more riskable variables related to reservoir data and parameters of the first drilling technique; and
   wherein generating the first skin factor comprises iteratively generating a range of skin factors, varying one or more of the riskable variables in each iteration.

6. The method of claim 5, wherein the method further comprises: generating the first set of production data from the range of skin factors.

7. The method of claim 6, wherein the method further comprises:
   entering a range of one or more riskable variables related to cost data of the first drilling technique; and
   wherein generating the first total cost comprises iteratively generating a range of total costs, varying one or more of the riskable variables each iteration.

8. The method of claim 7, wherein the method further comprises: combining the first set of production data and the first set of total cost data and generating a report indicating the economic impact of drilling the reservoir using the first technique.

9. The method of claim 1, wherein the first and second drilling techniques are, respectively, underbalanced and overbalanced drilling techniques.

10. The method of claim 4, wherein the method further comprises:
    generating a second set of production data from the second skin factor;
    providing an interface allowing a user to enter cost data of the second drilling technique and generating a second total cost based on the cost data;
    combining the production data and the total cost data and generating a report indicating the economic impact of drilling the reservoir using the second technique; and
    combining the report of the first technique with the report of the second technique.

11. The method of claim 5, wherein the method further comprises: generating the relative sensitivity of the first skin factor to each of the riskable variables.

12. The method of claim 1, wherein one of the parameters of the drilling techniques is rate of penetration.

13. The method of claim 1, wherein the first and second drilling techniques are, respectively, near balanced and overbalanced drilling techniques.

14. A tangible computer storage medium for analyzing an impact of drilling of a reservoir comprising: processor executable instructions for causing the processor to perform the method comprising:
    providing an interface allowing a user to enter reservoir data;
    providing an interface allowing a user to enter parameters of a first drilling technique;
    generating a first skin factor based on the reservoir data and the parameters of the first drilling technique;
    providing an interface allowing a user to enter parameters of a second drilling technique;
    generating a second skin factor based on the reservoir data and the parameters of the second drilling technique; and
    comparing the drilling techniques using the first and second skin factors and selecting one of the first or second drilling techniques.

15. The computer-readable medium of claim 14, wherein the operations further comprise: generating a first set of production data from the first skin factor.

16. The computer-readable medium of claim 15, wherein the operations further comprise: providing an interface allowing a user to enter cost data of the first drilling technique and generating a first total cost based on the cost data.

17. The computer-readable medium of claim 16, wherein the operations further comprise: combining the production data and the total cost data and generating a report indicating the economic impact of drilling the reservoir using the first technique.

18. The computer-readable medium of claim 14, wherein the operations further comprise:
providing an interface allowing a user to enter a range of one or more riskable variables related to reservoir data and parameters of the first drilling technique; and
wherein generating the first skin factor comprises iteratively generating a range of skin factors, varying one or more of the riskable variables each iteration.

19. The computer-readable medium of claim 18, wherein the operations further comprise: generating a first set of production data from the range of skin factors.

20. The computer-readable medium of claim 19, wherein the operations further comprise:
providing an interface allowing a user to enter a range of one or more riskable variables related to cost data of the first drilling technique; and
wherein generating the first total cost comprises iteratively generating a range of total costs, varying one or more of the riskable variables each iteration.

21. The computer-readable medium of claim 20, wherein the operations further comprise: combining the first set of production data and the first set of total cost data and generating a report indicating the economic impact of drilling the reservoir using the first technique.

22. The computer-readable medium of claim 17, wherein the first and second drilling techniques are, respectively, underbalanced and overbalanced drilling techniques.

23. The computer-readable medium of claim 14, wherein the operations further comprise: generating a second set of production data from the second skin factor;
providing an interface allowing a user to enter cost data of the second drilling technique and generating a second total cost based on the cost data;
combining the production data and the total cost data and generating a report indicating the economic impact of drilling the reservoir using the second technique; and
combining the report of the first technique with the report of the second technique.

24. The computer-readable medium of claim 14, wherein the operations further comprises: providing a library of previously completed well data allowing a user to calibrate the program.

25. The computer-readable medium of claim 14, wherein one of the parameters of the drilling techniques is rate of penetration.

26. The computer-readable medium of claim 14, wherein the first and second drilling techniques are, respectively, near balanced and overbalanced drilling techniques.

27. The computer-readable medium of claim 18, wherein the method further comprises generating the relative sensitivity of the skin factor to each of the riskable variables.

* * * * *